US008913673B2

(12) United States Patent
Dai et al.

(10) Patent No.: US 8,913,673 B2
(45) Date of Patent: Dec. 16, 2014

(54) METHOD AND APPARATUS FOR TRANSMITTING RANK INDICATION INFORMATION

(75) Inventors: Bo Dai, Guangdong Province (CN); Shuqiang Xia, Guangdong Province (CN); Chunli Liang, Guangdong Province (CN); Peng Hao, Guangdong Province (CN); Guanghui Yu, Guangdong Province (CN)

(73) Assignee: ZTE Corporation, Shenzhen (CN)

( * ) Notice: Subject to any disclaimer, the term of this patent is extended or adjusted under 35 U.S.C. 154(b) by 322 days.

(21) Appl. No.: 13/003,997

(22) PCT Filed: Jul. 3, 2009

(86) PCT No.: PCT/CN2009/072622
§ 371 (c)(1),
(2), (4) Date: Jan. 13, 2011

(87) PCT Pub. No.: WO2010/009650
PCT Pub. Date: Jan. 28, 2010

(65) Prior Publication Data
US 2011/0129033 A1    Jun. 2, 2011

(30) Foreign Application Priority Data
Jul. 23, 2008    (CN) .......................... 2008 1 0142974

(51) Int. Cl.
*H04K 1/00*    (2006.01)
*H04B 7/06*    (2006.01)
(52) U.S. Cl.
CPC ............. *H04B 7/063* (2013.01); *H04B 7/0671* (2013.01)
USPC .......................................... 375/260

(58) Field of Classification Search
USPC .......................................... 375/260
See application file for complete search history.

(56) References Cited

U.S. PATENT DOCUMENTS 6,456,649 B1 * 9/2002 Isaksson et al. ............... 375/222
7,912,133 B2 * 3/2011 Cheon et al. ............. 375/240.27
(Continued)

FOREIGN PATENT DOCUMENTS

CN    101286970 A    10/2008
CN    101394251 A    3/2009

OTHER PUBLICATIONS

3$^{rd}$ Generation Partnership Project, Technical Specification Group Radio Access Network, Physical Layer Procedures(Release 8), pp. 30-36, May 2008, 3GPP TS 36.213, available at http://www.3gpp.org/ftp/Spcs/archive/36_series/36.213/36211-830.zip.

(Continued)

*Primary Examiner* — Santiago Garcia
(74) *Attorney, Agent, or Firm* — Venable LLP; Robert Kinberg (57) ABSTRACT

The present invention discloses a method and apparatus for transmitting rank indication information, in which the method comprises: when rank indication information and a sounding reference signal are transmitted in a same sub-frame, loading the sounding reference signal to a last symbol of a sub-frame, and transmitting the rank indication information and the sounding reference signal. The present invention prevents destruction of orthogonality of codes between PUCCH channels when the rank indication information and the sounding reference signal are transmitted in the same sub-frame, thus the overall performance of the system can be ensured.

4 Claims, 8 Drawing Sheets

(56) References Cited

U.S. PATENT DOCUMENTS

| | | | | |
|---|---|---|---|---|
| 8,130,711 | B2* | 3/2012 | Noh et al. | 370/329 |
| 2005/0105589 | A1* | 5/2005 | Sung et al. | 375/130 |
| 2005/0105640 | A1* | 5/2005 | Han et al. | 375/295 |
| 2007/0217530 | A1* | 9/2007 | Hosseinian et al. | 375/260 |
| 2008/0043867 | A1* | 2/2008 | Blanz et al. | 375/260 |
| 2009/0046805 | A1* | 2/2009 | Kim et al. | 375/295 |
| 2009/0204863 | A1* | 8/2009 | Kim et al. | 714/748 |
| 2009/0225722 | A1* | 9/2009 | Cudak et al. | 370/330 |
| 2009/0239566 | A1* | 9/2009 | Pelletier et al. | 455/517 |
| 2010/0039953 | A1* | 2/2010 | Zhang | 370/252 |
| 2010/0067453 | A1* | 3/2010 | Noh et al. | 370/329 |
| 2010/0103902 | A1* | 4/2010 | Kim et al. | 370/330 |
| 2010/0255853 | A1* | 10/2010 | Kountouris | 455/450 |
| 2010/0316014 | A1* | 12/2010 | Choi et al. | 370/329 |
| 2012/0147770 | A1* | 6/2012 | Noh et al. | 370/252 |
| 2012/0224659 | A1* | 9/2012 | Yu et al. | 375/340 |

OTHER PUBLICATIONS $3^{rd}$ Generation Partnership Project, Technical Specification Group Radio Access Network, Physical Channels and Modulation(Release 8), pp. 21-28, May 2008, 3GPP TS 36.211, available at http://www.3gpp.org/ftp/Spcs/archive/36_series/36.213/36211-830.zip.

European Search Report issued in European Application No. 09799965.0 dated Oct. 27, 2011.

Nokia Siemens Networks et al., "Multiplexing between Rank and SR," 3GPP TSG RAN WG1 Meeting #53, R1-081854, Kansas City, MO, May 5-9, 2008, 4 pp.

Nokia Siemens Networks et al., "Multiplexing between Rank and SR," 3GPP TSG RAN WG1 Meeting #52bis, R1-081455, Shenzhen, China, Mar. 31-Apr. 4, 2008, 6 pp.

ZTE Corporation. "Remaining Issues with RI Multiplexing on PUCCH." 3GPP TSG-RAN WG1 Meeting # 54. Jeju, Korea, Aug. 18-22, 2008.

ZTE Corporation. "Remaining Issues with RI Multiplexing on PUCCH." 3GPP TSG-RAN WGI Meeting #54 bis. Prague, Czech Republic. Sep. 29-Oct. 3, 2008.

"3rd Generation Partnership Project; Technical Specification Group Radio Access Network; Evolved Universal Terrestrial Radio Access (E-UTRA); Physical layer procedures." $3^{rd}$ Generation Partnership Project. (May 2008).

"3rd Generation Partnership Project; Technical Specification Group Radio Access Network; Evolved Universal Terrestrial Radio Access (E-UTRA); Physical Channels and Modulation" $3^{rd}$ Generation Partnership Project. (May 2008).

* cited by examiner

METHOD AND APPARATUS FOR TRANSMITTING RANK INDICATION INFORMATION

FIELD OF THE INVENTION

The present invention relates to the communication field, in particular to a method and apparatus for transmitting Rank Indication, RI, information.

BACKGROUND OF THE INVENTION

The Multiple-Input Multiple-Output (MIMO) technology is a key technology of the third generation (3G) and the fourth generation (4G) mobile communication systems, which can increase the system capacity, improve the transmission performance, and be perfectly integrated with other technologies in the physical layer. However, if the correlation between the channels is relatively strong, the diversity gain and the multiplexing gain brought by multipath channels can be reduced greatly, thereby greatly reducing the performance of the MIMO system. Presently, a new MIMO precoding method is provided, which is a high efficient MIMO multiplexing method, a MIMO channel can be divided into a plurality of independent virtual channels through precoding processes on receiving/transmitting ends, thus the impact of the channel correlation is effectively eliminated, and therefore the precoding technology can ensure the stability of the MIMO system under different circumstances.

The Long Term Evolution (LTE) system is an important plan of the third generation partnership. The precoding technology in the LTE is realized by setting a codebook (a set of precoding matrices) in User Equipment (UE) and evolved Node Base (eNodeB), and the UE selects an optimum precoding matrix from the codebook based on a certain principle (for example, maximized throughout capacity, or the right singular matrix closest to the channel matrix), and feedbacks a Precoding Matrix Index (PMI) to the eNodeB, the eNodeB looks for the corresponding precoding matrix in the codebook according to the received PMI, and uses the precoding matrix to perform precoding transmission in the downlink transmission, in addition, Rank Instruction (RI) information is required to be fed back in the uplink channel, and the RI information indicates the maximum number of symbols that can be transmitted on a sub-carrier.

Figure 1:
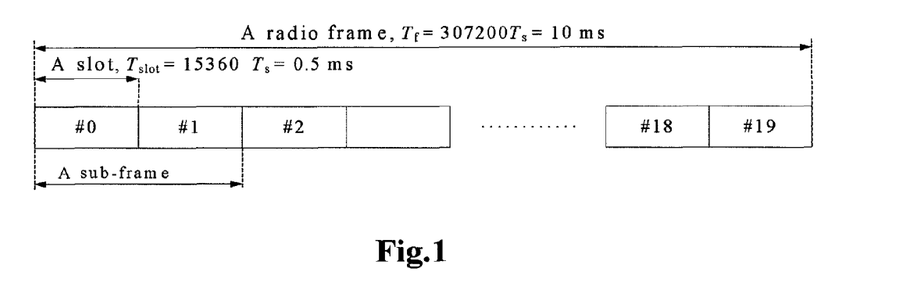
FIG. 1 is a schematic view of a basic frame structure in the LTE system according to the related art.

FIG. 1 shows a structure schematic view of a basic frame structure in the LTE system. As shown in FIG. 1, a frame structure is classified into four grades: radio frame, half frame, sub-frame, slot and symbol, wherein the length of a radio frame is 10 ms, and a radio frame comprises two half frames with the length of 5 ms each; a half frame comprises five sub-frames with the length of 1 ms each; a sub-frame comprises two slots with the length of 0.5 ms each.

When the LTE system uses a normal cyclic prefix, a slot comprises seven uplink/downlink symbols with the length of 66.7 us each, wherein the length of the Cyclic Prefix (CP) of the first symbol is 5.21 us, and the length of the cyclic prefixes of the other six symbols is 4.69 us each.

When the LTE system uses an extended cyclic prefix, a slot comprises six uplink/downlink symbols with the length of 66.7 us each, wherein the length of the cyclic prefix of each symbol is 16.67 us.

Figure 2:
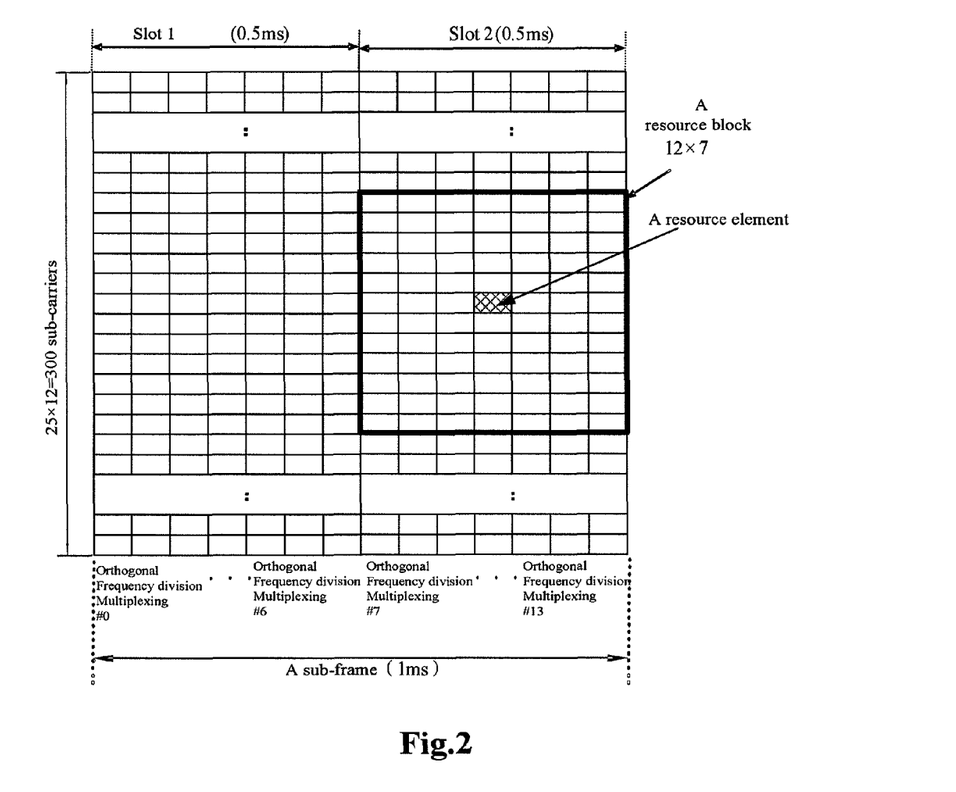
FIG. 2 is a schematic view of a RB of the LTE system with 5 MHz bandwidth according to the related art.

A Resource Element (RE) is a sub-carrier in an orthogonal frequency division multiplexing (OFDM) symbol, and a downlink Resource Bock (RB) comprises twelve continuous sub-carriers and seven continuous OFDM symbols (or six OFDM symbols when the CP is the longer ones), which is 180 kHz in the frequency domain, and is a time span of a normal slot in the time domain. FIG. 2 shows a structure schematic view of a resource block of the LTE system with 5 MHz bandwidth. As shown in FIG. 2, when performing resource distribution, the resource block is taken as the basic unit to be distributed.

When a target user feeds back the RI information, if the target user does not need to transmit data, the RI information is transmitted in a Physical Uplink Control Channel (PUCCH), if the target user needs to transmit data, the RI information is transmitted in the Physical Uplink Shared Channel (PUSCH).

Figure 3:
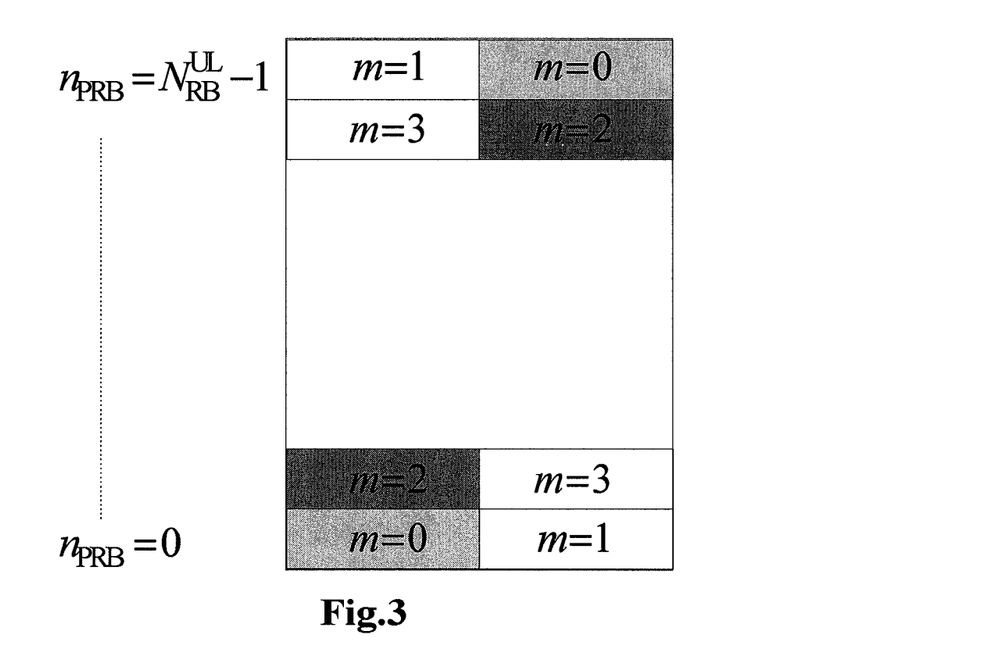
FIG. 3 is a schematic view of the frequency domain position of the PUCCH in LTE system according to the related art.

The formats of the PUCCH are classified into 6 types, which are format 1, format 1a, format 1b, format 2, format 2a and format 2b, wherein format 1 is used for transmitting 1-bit Scheduling Request (SR) information representing that the SR exists or not; format 1a is used for transmitting ACK/NACK (acknowledgement/negative acknowledgement) information of 1-bit single codeword flow; format 1b is used for transmitting ACK/NACK information of 2-bit dual codeword flow, wherein each codeword corresponds to 1-bit ACK/NACK information; format 2 is used for transmitting Channel Quality Indicator (CQI)/PMI and the RI information; format 2a is used for transmitting the CQI/PMI and the RI information, the ACK/NACK information of the single code word flow, and is used in the case that the CP is a normal CP; format 2b is used for transmitting the CQI/PMI and the RI information, the ACK/NACK information of the dual codeword flow, and is used in the case that the CP is the normal CP. FIG. 3 shows a schematic view of the frequency domain position of the PUCCH in the LTE system. As shown in FIG. 3, each PUCCH channel occupies resources of two resource blocks; the length of the RI information is 1 bit or 2 bits, and when the RI information and the CQI/PMI information are transmitted in the same sub-frame, only the RI information is transmitted.

Figure 4:
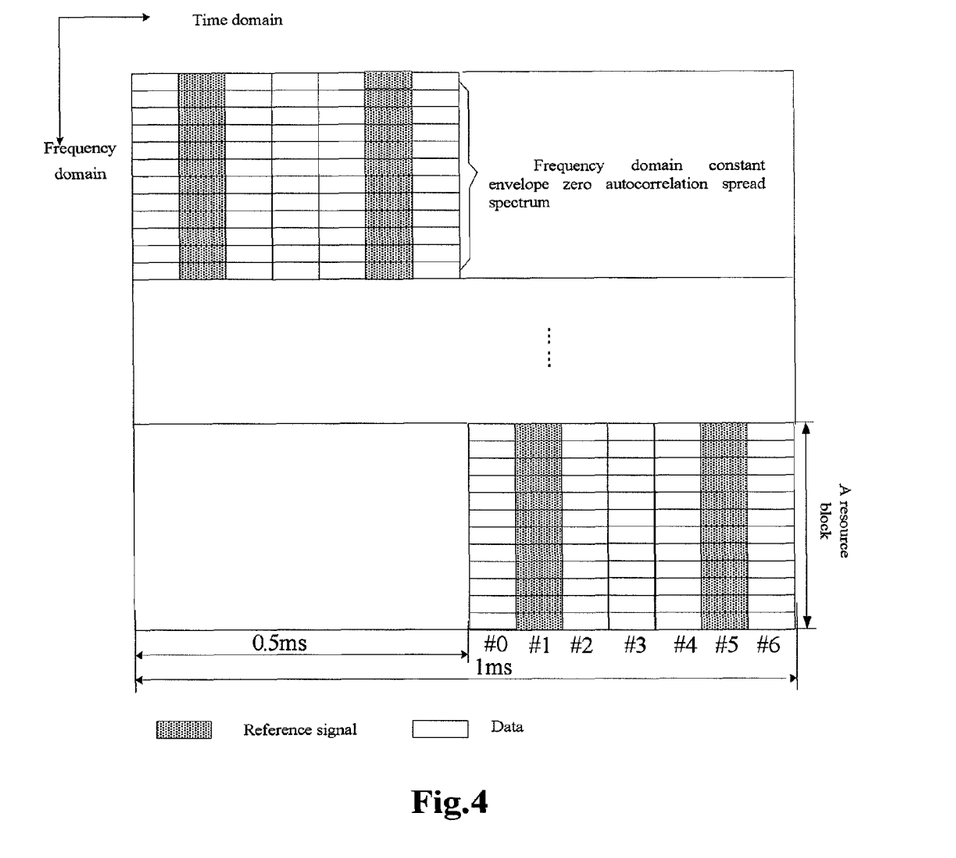
FIG. 4 is a schematic view of PUCCH channel for transmitting RI information when the system uses the normal CP according to the related art.

The channel structure of PUCCH format 2 is described hereinafter:

FIG. 4 shows a schematic view of the PUCCH channel for transmitting the RI information when the system uses the normal CP. As shown in FIG. 4, in the normal CP, a Constant Amplitude Zero Auto Correlation (CAZAC) sequence with a length of 12 is selected as the basic sequence, and the CAZAC sequence is repeated for 7 times, and each position of twelve frequency domains on each symbol of a resource block is mapped with one CAZAC sequence, wherein the sequences on the symbols of slot #0, #2, #3, #4 and #6 are used for transmitting the data on the PUCCH channel, and the sequences on the symbols of slot #1 and #5 are used for transmitting the Reference Signal (RS) on the PUCCH channel.

Figure 5:
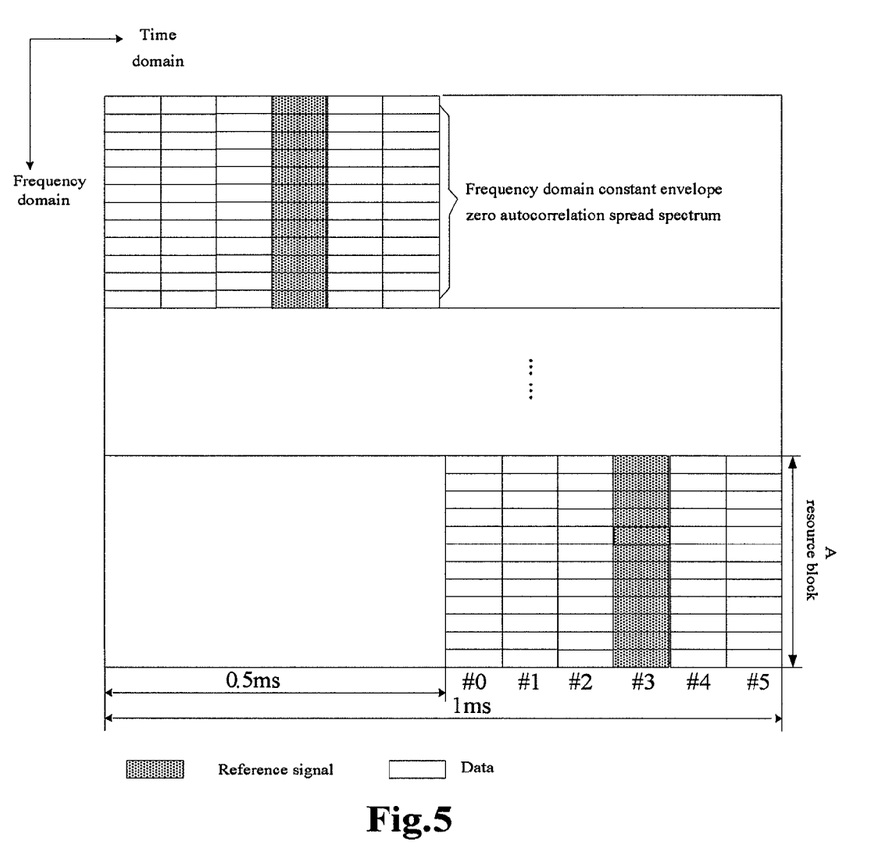
FIG. 5 is a schematic view of PUCCH channel for transmitting RI information when the system uses the extended CP according to the related art.

FIG. 5 shows a schematic view of the PUCCH channel for transmitting the RI information when the system uses the expanded CP. As shown in FIG. 5, in the expanded CP, the CAZAC sequence with a length of 12 is selected as the basic sequence, and the CAZAC sequence is repeated for 6 times, each position of twelve frequency domains on each symbol of a resource block is mapped with one CAZAC sequence, wherein the sequences on the symbols of slot #0, #1, #2, #4 and #5 are used for transmitting the data on the PUCCH channel, and the sequence on the symbol of slot No. 3 is used for transmitting the RS on the PUCCH channel.

The number of bits of the CQI/PMI and the RI information is 20 after coding. The coded bits will be processed by a Quadrature Phase Shift Keying (QPSK) modulation, and be modulated as ten QPSK modulation symbols. Each slot is mapped with five QPSK modulation symbols, and each modulation symbol corresponds to the data sequence of a PUCCH channel, the modulation symbol is multiplied with the target data sequence, is mapped onto a corresponding carrier, and then is sent out, wherein a Sounding Reference Signal (SRS) is transmitted in the last symbol of a sub-frame.

In the LTE system, the transmission of the uplink data uses the Single Carrier Frequency Division Multiple Access (SC-FDMA) method, which requires the uplink resources to be continuously mapped, and after the data to be transmitted on each symbol is modulated, a Discrete Fourier Transform (DFT for short) process needs to be performed, and then to be mapped on the frequency domain position. If the PUCCH channel and the SRS are transmitted in the same symbol, an inter-code disturbance will be produced, thus the orthogonality of the codes between the PUCCH channels can not be ensured, thereby leading to a decline of the system performance.

In the LTE standard, when the uplink ACK/NACK information and the SRS are transmitted in the same symbol, the uplink ACK/NACK information will be transmitted using a short code structure; when the CQI/PMI information and the SRS are transmitted in the same symbol, the CQI/PMI information will be transmitted using the short code structure; when the SR information and the SRS are transmitted in the same symbol, the SR information is transmitted in the symbol, and the SRS is not transmitted; and for the method for transmitting the RI information and the sounding reference signal in the same sub-frame, the prior art does not provide a concrete proposal.

SUMMARY OF THE PRESENT INVENTION

The present invention is proposed considering the problem in the prior art that the related art does not provide a concrete proposal for the transmission of the RI information and the sounding reference signal in the same sub-frame, therefore the present invention aims at providing a method and apparatus for transmitting the RI information to solve the problem.

For realizing the above aims, the present invention aims at providing a method for transmitting the RI information according to one aspect of the present invention.

The method for transmitting RI information according to the present invention comprises: when the RI and an SRS are transmitted in the same sub-frame, loading the SRS in a last symbol of the sub-frame; transmitting the RI information and the SRS.

Preferably, the transmission of the RI information and the SRS is: transmitting the SRS in the last symbol; transmitting the RI information in other symbols except the last one.

Preferably, the sub-frame structure comprises one of the following: a normal CP sub-frame structure and an extended CP sub-frame structure.

For realizing the above aims, a method for transmitting RI information is provided according to another aspect of the present invention.

The method for transmitting RI information provided by the embodiment of the present invention comprises: when the RI information and SRS are transmitted in the same sub-frame, only transmitting the RI information.

For realizing the above aims, an apparatus for transmitting RI information is provided according to another aspect of the present invention.

The apparatus for transmitting RI information according the embodiment of the present invention comprises: a loading module, configured to, when the RI information and a Sounding Reference Signal are transmitted in a same sub-frame, load the SRS in a last symbol of the sub-frame; a transmitting module, configured to transmit the RI information and the SRS.

The problem of the destruction of the orthogonality of the codes between the PUCCH channels when the RI information and the SRS are transmitted in the same sub-frame is solved through at least one of the above-mentioned technical solutions, thus the overall performance of the system can be ensured.

BRIEF DESCRIPTION OF THE DRAWINGS

The drawings in the specification provide a further understanding to the present invention and constitute a part of the application. The exemplary embodiments of the present invention and the explanation thereof are given thereafter by way of illustration only, and thus are not limitative of the present invention. in the drawings.

DETAILED DESCRIPTION

General Description of Functions

The technical solution provided by the embodiments of the present invention stipulates that when the RI information and the SRS are transmitted in the same sub-frame, the SRS is loaded in the last symbol of the sub-frame, and the RI information is loaded in other symbols of the sub-frame except for the last one; or the SRS is not transmitted, and only the RI information is transmitted. The solution can solve the problem of the destruction of the orthogonality of the codes between the PUCCH channels when the RI information and the SRS are transmitted in the same sub-frame, thus the overall performance of the system can be ensured.

The present invention will be detailed hereinafter in combination with the drawings. It should be understood that, if un-conflictive, the embodiments of the present invention can be inter-combined with the characteristics in the embodiments.

Method Embodiment

According to the embodiment of the present invention, a method for transmitting the RI information is provided.

Figure 6:
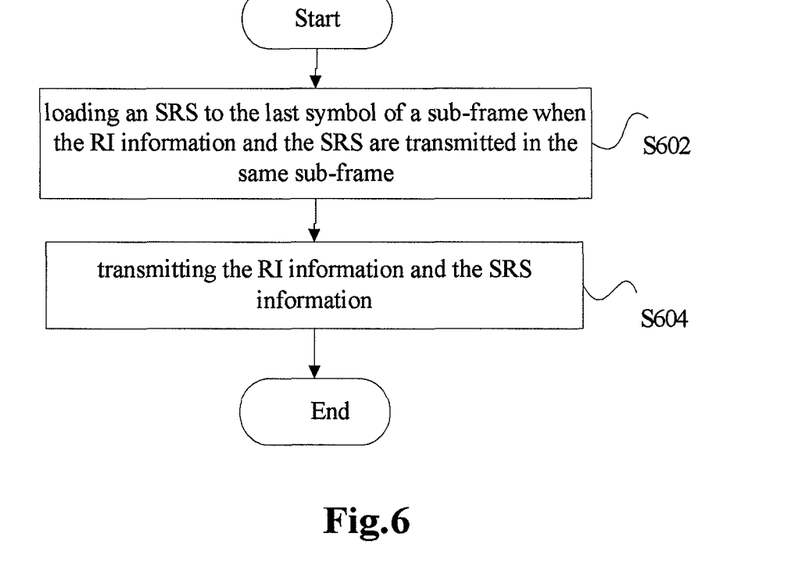
FIG. 6 is a flowchart of a method for transmitting RI information according to a method embodiment of the present invention.

FIG. 6 is a flowchart of a method for transmitting the RI information according to an embodiment of the present invention. As shown in FIG. 6, the method comprises the following step S602 to step S604:

Step S602, loading a sounding reference signal in a last symbol of a sub-frame when the rank indication information (RI) and the sounding reference signal (SRS) are transmitted in the same sub-frame;

Step S604, transmitting the RI information and the SRS, specifically, transmitting the SRS in the last symbol, and transmitting the RI information in other symbols except for the last symbol, namely, the last symbol is not used for transmitting the sequence of the RI information.

The technical solution provided by the embodiment of the present invention solves the problem of the destruction of the orthogonality of the codes between the PUCCH channels when the RI information and the SRS are transmitted in the same sub-frame, thus the overall performance of the system can be ensured.

A method for transmitting the RI information is further provided according to an embodiment of the present invention, in the method, when the RI information and the SRS are transmitted in the same sub-frame, only the RI information is transmitted.

FIG. 2 is a schematic view of a RB of the 3 GPP LTE system with 5 MHz bandwidth. As shown in FIG. 2, the total number of the sub-carriers is 512, wherein available sub-carriers are the 300 ones in the middle, each RB comprises 12 continuous sub-carriers, and then the 3 GPP LTE system with 5M bandwidth comprises 25 RBs in total. If the number of the available RBs in the uplink is $N_{RB}^{UL}$, all the RBs are numbered by $0, 1, 2, \ldots, N_{RB}^{UL}-1$ from lower to higher according to the sequence of the frequency domain, $n_{PRB}$ representing the index of the RB, and then the frequency domain position of the PUCCH channel with the number of m is as shown in FIG. 3. The embodiment of the present invention will be detailed hereinafter with the example of the 3 GPP LTE system with 5M bandwidth.

Condition I: when a target user transmits information to a base station, and when the PUCCH channel for transmitting the RI information and the SRS are transmitted in the same sub-frame, the RI information can be transmitted in each symbol of the sub-frame, while the SRS is not transmitted.

The structure of the sub-frame can be a normal CP sub-frame structure, and also can be an expanded CP sub-frame structure. For this reason, the following two conditions will be described.

Condition II: when the system uses the normal CP sub-frame structure, if the PUCCH channel for transmitting the RI information and the SRS are transmitted in the same sub-frame, a CAZAC sequence with a length of 12 searched by a computer can be selected and the CAZAC sequence can be taken as the basic sequence.

Figure 7:
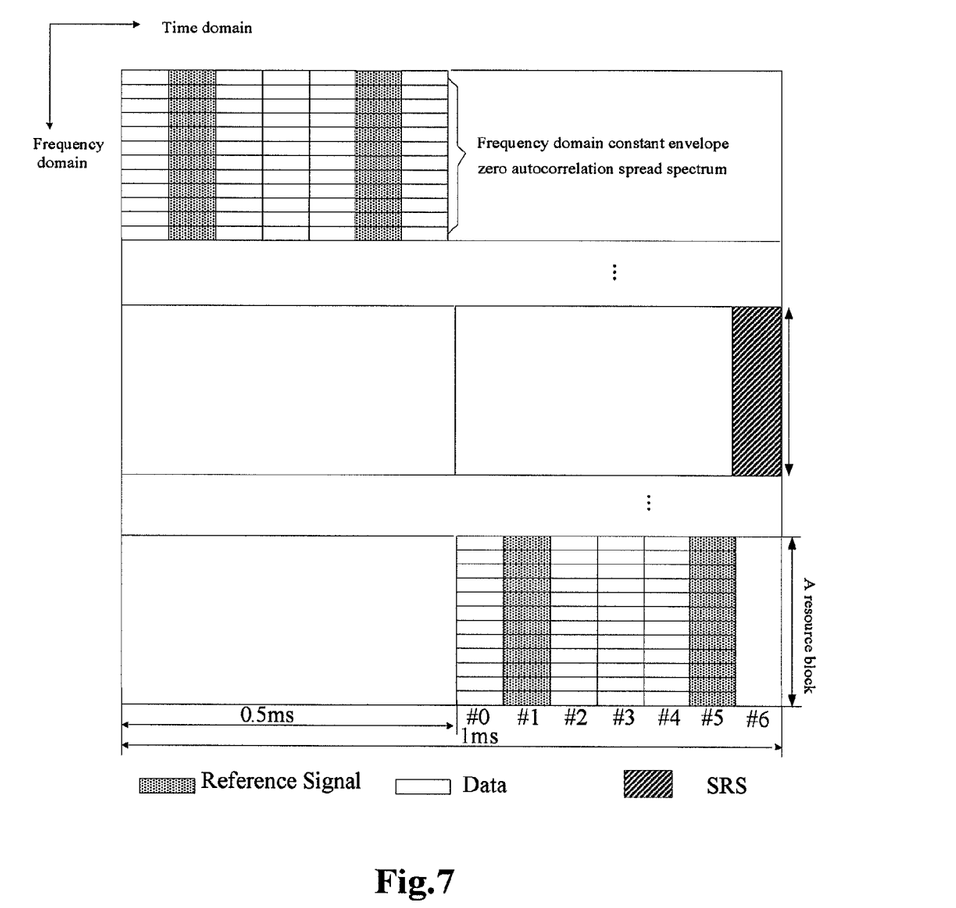
FIG. 7 is a schematic view of a structure for transmitting RI information of PUCCH channel and SRS when the system uses the normal CP according to a method embodiment of the present invention.

FIG. 7 is a schematic view of a structure for transmitting the RI information of the PUCCH channel according to an embodiment of the present invention. As shown in FIG. 7, the CAZAC sequence is repeated for 7 times, each position of the twelve frequency domains on each symbol of a RB is mapped with one CAZAC sequence, wherein the sequences on #0, #2, #3, #4 and #6 symbols of each slot are used for transmitting the data of the PUCCH channel, and the sequences on #1 and #5 symbols of slot are used for transmitting the SRS of the PUCCH channel. The RI information will be coded, wherein the coded RI information is 20 bit. The coded RI information will be processed with a QPSK modulation, and be modulated as ten QPSK modulation symbols. Each slot is mapped with five QPSK modulation symbols, and each modulation symbol will correspond to the data sequence of a PUCCH channel; the modulation symbol is multiplied with the target data sequence, and then the result of the multiplication is mapped onto a corresponding carrier, and is transmitted to the base station;

At the same time, the SRS is loaded in a carrier corresponding to the last symbol of the sub-frame, and then is transmitted to the base station; and the RI information loaded in the last symbol is not transmitted.

Condition III: when the system uses the expanded CP sub-frame structure, if the PUCCH channel for transmitting the RI information and the SRS are transmitted in the same sub-frame, a CAZAC sequence with a length of 12 searched by computer can be selected and the CAZAC sequence can be taken as the basic sequence.

Figure 8:
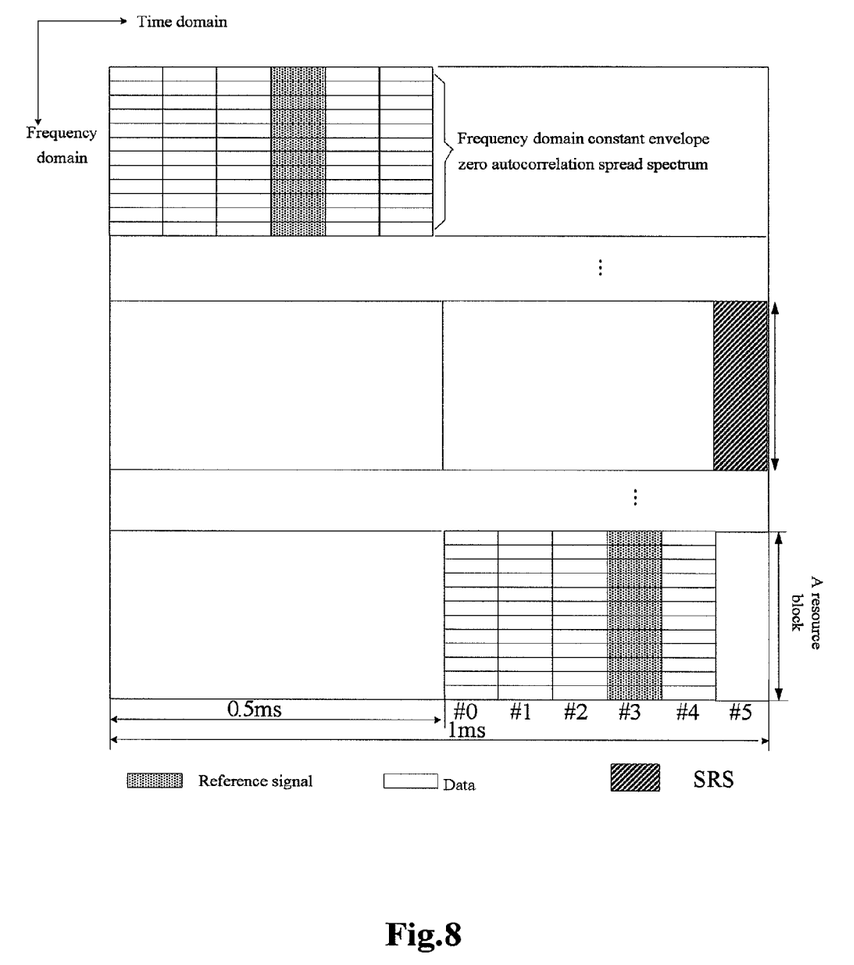
FIG. 8 is a schematic view of a structure for transmitting RI information of PUCCH channel and SRS when the system uses the extended CP according to a method embodiment of the present invention.

As shown in FIG. 8, the CAZAC sequence is repeated for 6 times, each position of the twelve frequency domains on each symbol of a RB is mapped with one CAZAC sequence, wherein the sequences on #0, #1, #2, #4 and #5 symbols of each slot are used for transmitting the data of the PUCCH channel, and the sequence on #3 symbol of each slot is used for transmitting the SRS on the PUCCH channel. The RI information will be coded, wherein the coded RI information is 20 bit. The coded RI information will be processed with a QPSK modulation, and be modulated as ten QPSK modulation symbols. Each slot is mapped with five QPSK modulation symbols, and each modulation symbol will correspond to the data sequence of a PUCCH channel; the modulation symbol is multiplied with the target data sequence, and then the result of the multiplication is mapped onto a corresponding carrier, and is transmitted to the base station.

At the same time, the SRS is loaded in a carrier corresponding to the last symbol of the sub-frame, and then is transmitted to the base station; and the RI information loaded in the last symbol is not transmitted.

A computer readable medium is further provided according to an embodiment of the present invention. The readable medium is stored with performable instructions of the computer, when the instruction are performed by the computer or a processor, the computer or the processor will perform step S602 and step S604 as shown in FIG. 6; preferably, one or more than one conditions of the condition I to the condition III can be performed.

Apparatus Embodiment

According to an embodiment of the present invention, an apparatus for transmitting the RI information is provided.

Figure 9:
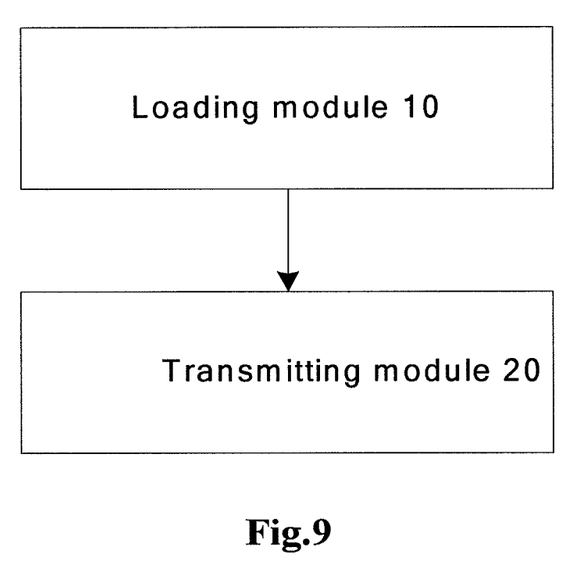
FIG. 9 is a structural framework view of an apparatus for transmitting RI information according to a device embodiment of the present invention.

FIG. 9 shows a structural framework view of an apparatus for transmitting the RI information according to an embodiment of the present invention. As shown in FIG. 9, the apparatus comprises:

a loading module 10, configured to, when RI information and an SRS are transmitted in a same sub-frame, load the SRS in a last symbol of the sub-frame;

a transmitting module 20, configured to transmit the RI information and the SRS, and the module can be connected with the loading module 10.

The apparatus for transmitting the RI information provided by the embodiment of the present invention solves the problem of the orthogonality of the codes between the PUCCH channels when the RI information and the SRS are transmitted in the same sub-frame, thus the overall performance of the system can be ensured.

As mentioned above, the problem of the orthogonality of the codes between the PUCCH channels when the RI information and the SRS are transmitted in the same sub-frame is solved through the method and/or apparatus for transmitting the RI information provided by the present invention, thus the overall performance of the system can be ensured.

The descriptions above are only preferable embodiments of the present invention, which are not used to restrict the present invention. For those skilled in the art, the present invention may have various changes and variations. Any amendments, equivalent substitutions, improvements etc. within the spirit and principle of the present invention are all concluded in the scope of protection of the present invention.

The invention claimed is:

1. A method for transmitting Rank Indication, RI, information, when a target user transmits information to a base station in the Long Term Evolution (LTE) system, comprising:
   in the LTE system, when the RI information and a Sounding Reference Signal, SRS, are transmitted in a same sub-frame, loading the SRS in a last symbol of the sub-frame; and
   transmitting the RI information and the SRS by the target user, wherein the transmitting the RI information and the SRS specifically is: transmitting the SRS in the last symbol and transmitting the RI information in other symbols except for the last symbol by using a Single Carrier Frequency Division Multiple Access method; and
   wherein the SRS is used for sounding the state of channel.

2. The method according to claim 1, wherein the sub-frame structure comprises one of the following structures: a normal Cyclic Prefix, CP, sub-frame structure, an expanded CP sub-frame structure.

3. A method for transmitting Rank Indication, RI, information, when a target user transmits information to a base station in the LTE system, comprising:
   in the LTE system, when the RI information and a Sounding Reference Signal, SRS, are to be transmitted in a same sub-frame, only transmitting the RI information by the target user;
   wherein the SRS is used for sounding the state of channel.

4. An apparatus for transmitting Rank Indication, RI, information, comprising:
   a loading module, configured to, in the LTE system, when the RI information and a Sounding Reference Signal, SRS, are transmitted in a same sub-frame, load the SRS in a last symbol of the sub-frame; and
   a transmitting module, configured to transmit the SRS in the last symbol and the RI information in other symbols except for the last symbol from a target user to a base station in the LTE system by using Single Carrier Frequency Division Multiple Access method;
   wherein the SRS is used for sounding the state of channel.

* * * * *